May 1, 1956
R. B. EATON
2,744,060
PROCESS FOR SEPARATING HAFNIUM TETRACHLORIDE
FROM ZIRCONIUM TETRACHLORIDE
Filed Oct. 9, 1952
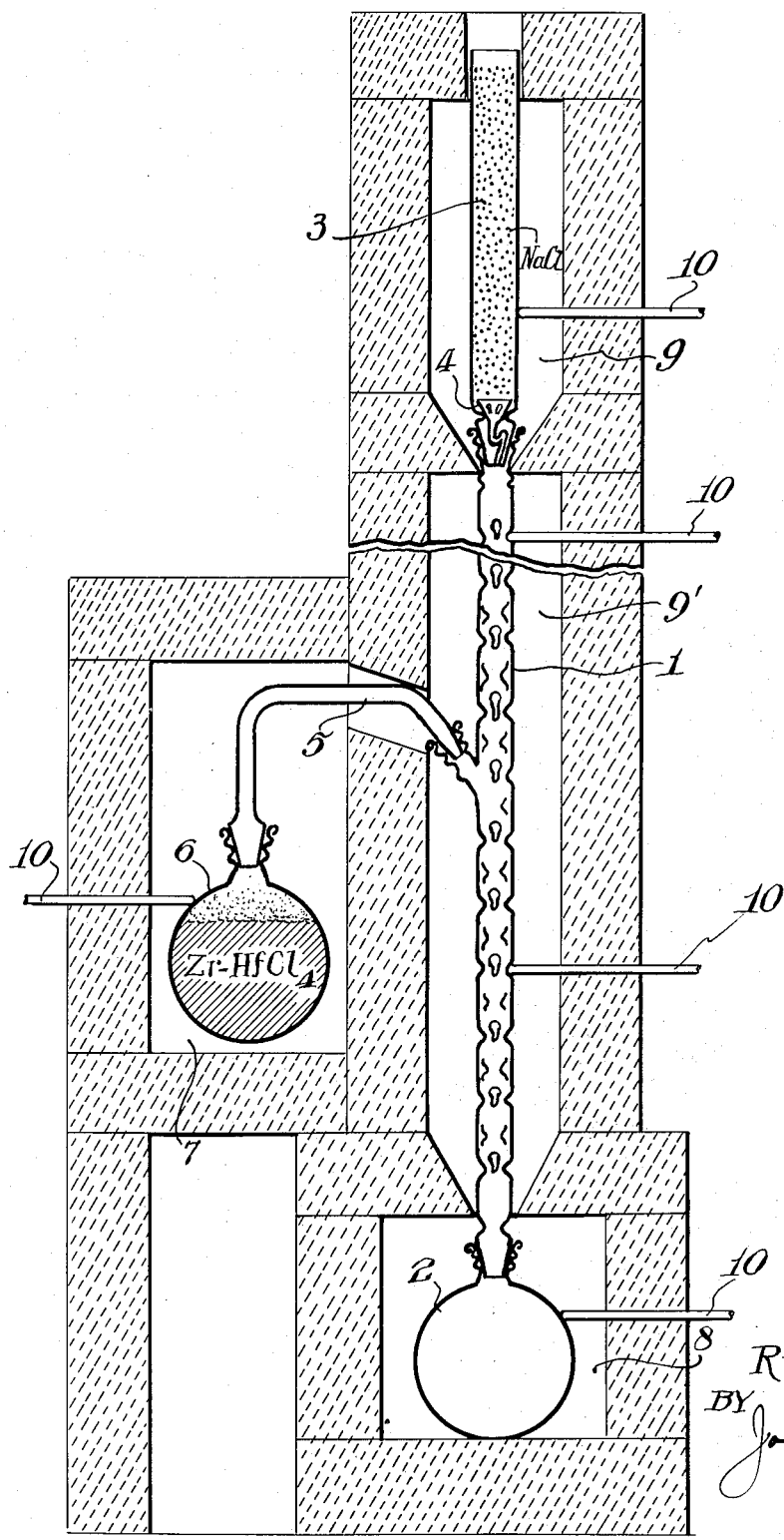
INVENTOR
*Russell B. Eaton*
BY
ATTORNEY United States Patent Office 2,744,060
Patented May 1, 1956

2,744,060

PROCESS FOR SEPARATING HAFNIUM TETRA-CHLORIDE FROM ZIRCONIUM TETRACHLORIDE

Russell B. Eaton, Landenberg, Pa., assignor to E. I. du Pont de Nemours and Company, Wilmington, Del., a corporation of Delaware Application October 9, 1952, Serial No. 313,993

7 Claims. (Cl. 202—39)

This invention relates to novel methods for separating zirconium and hafnium compounds from compositions containing mixtures of compounds of the two elements. More particularly, it relates to the separation of volatile zirconium and hafnium halides and the recovery of the separated halides in anhydrous form.

Because of the extreme similarity in chemical properties of zirconium and hafnium, the separation of these two elements (always associated together in nature) has proved exceedingly tedious and difficult. Recently, a great potential use for elemental zirconium has been indicated due to certain unique nuclear properties which that element possesses when freed of associated hafnium. Thus, in a recent article (Journ. of Chem. Ed. 28, 529, 1951) various published methods for separating zirconium and hafnium compounds are discussed. These methods can be classified as follows: (1) fractional crystallization, (2) fractional precipitation, (3) fractional distillation of $POCl_3$ addition compounds of zirconium-hafnium halides, (4) fractional decomposition of complex ions of zirconium and hafnium fluorides. As recognized by the author, these methods suffer from the fact that they are non-adaptable for large-scale continuous or commercial use. Furthermore, each and all of these methods fail to yield an anhydrous type of halide product, such as zirconium chloride and hafnium chloride, which is essential for use in many applications and particularly in direct reduction processes to produce pure zirconium or hafnium metal.

It is among the objects of this invention to overcome the disadvantages of prior zirconium and hafnium separation methods and to provide an improved, commercially adaptable process for separating zirconium and hafnium halides. A further and particular object is to provide a novel method wherein separated zirconium and hafnium halides can be readily recovered in an anhydrous condition, so that they become adapted for direct use in reduction procedures to obtain pure forms of zirconium or hafnium metals useful in a nuclear reactor. Other objects and advantages of the invention will be evident from the ensuing description of my invention.

The above and other objects are attainable in this invention which comprises separating volatile halides of zirconium and hafnium from their vaporous mixture by contacting said mixture with a molten salt containing an alkali metal halide as solvent, and separately recovering the hafnium and zirconium components by fractionation.

In a more specific and preferred embodiment, the invention comprises separating hafnium and zirconium chlorides from their vaporous mixture by subjecting said mixture to contact with a countercurrently flowing, molten alkali metal chloride salt, such as sodium chloride, in a fractionation zone, and removing the separated hafnium-rich product from the upper portion of said zone and the zirconium-rich component from the lower portion of said zone.

For illustrative purposes the invention will be described in its application to the separation of the chlorides of zirconium and hafnium by fractional vapor extraction with sodium or potassium chloride. Obviously, it is not restricted thereto since it is also adaptable to the separation and recovery of other volatile zirconium and hafnium halides and through use of other alkali metal halides in which the mixture to be separated is soluble. Thus, in practically adapting the invention, use can be made of a glass or other desired type of conventional fractionating column having an associated receiver at its bottom, a reservoir to feed an alkali halide such as sodium or potassium chloride at the top portion thereof, and an associated vaporizing chamber from which the zirconium chloride-hafnium chloride mixture being separated can be charged into the column at a point substantially intermediate said top and bottom portions of the apparatus. Means for heating the entire apparatus in a controlled manner, and preferably to from 300–330° C., can also be associated therewith. The alkali metal chloride can be conveniently introduced as a granular solid into the reservoir provided for that purpose at the top of the column wherein it is subsequently contacted with the zirconium chloride or hafnium chloride vapors under treatment which can be fed to rise through the column from a suitable source of supply or production, e. g., from the chlorination of the mineral zirconium. Under these conditions, and with the column and solid salt maintained at 300–330° C., a low-melting mixture of alkali metal chloride and hafnium chloride or zirconium chloride forms in the reservoir and runs back down through the column where fractionation of zirconium chloride and hafnium chloride occurs. No vapors are allowed to escape from the top of the salt reservoir which, if desired, can be open to the atmosphere. Alternatively, the absorbing salt can be added continuously, as solid feed, directly to the top of the column, or as a low-melting eutectic of sodium chloride and potassium chloride, or as a melt of pure salt if vaporous products, directly from the column, should be desired.

In operation, a temperature gradient is maintained in the column ranging from about 330° C. at the top portion thereof to over 350° C. at its bottom. The receiver is held at a sufficiently high temperature (between about 350° C. and 500° C.) to maintain a constant vapor flow upward in the stripping section of the column. The vaporizing chamber is maintained at a temperature sufficiently above 330° C., and usually not over 400° C., so that a steady vapor feed of $ZrCl_4$—$HfCl_4$ mixture to the column will be maintained. Rate of vaporization and fractionation is determined by the characteristics of the column used.

The fused salt product recovered can be used directly in conventional reduction processes to produce pure zirconium or hafnium metals, or, if preferred, can be heated to distill out the dissolved zirconium or hafnium halides which can be readily collected as the desired separate, purified products. The invention makes advantageous use of several properties of zirconium and hafnium halides, compounding the slight differences in behavior of the zirconium and hafnium halides to create a larger overall difference which permits separation. The slightly greater volatility of hafnium halides over zirconium halides is amplified in the presence of a countercurrent flow of liquid salt which is easily formed due to the low melting point of zirconium and hafnium halide composition with alkali metal halides. Furthermore, the slight difference in solubility of zirconium and hafnium halides in the alkali metal halides undoubtedly further amplifies this effect.

To a clearer understanding of the invention, the following specific examples are given. These are merely in illustration and not in limitation of the invention:

Example I

A Pyrex glass distilling column 1 of the Snyder floating ball type shown in the accompanying drawing, with 12 sections approximately 1 inch O. D. by 2 inches long, was employed. A standard taper 24/40 ground joint at the bottom of the column was connected to an associated receiver 2 comprising a 1-liter round bottom flask. A treating salt reservoir 3, consisting of a 1.5 inch O. D. by 11-inch long Pyrex tube, was attached to the top of the column by means of the standard type of joint mentioned. A small glass perforated funnel 4 in the bottom of the reservoir served to support the salt feed in place. A small ½-inch side arm 5, sealed between the sixth and seventh sections, was connected through a 20/40 standard taper ground joint to the vaporizer 6 which also consisted of a 1-liter Pyrex round bottom flask. Separate heating units consisting of furnaces 7, 8, 9 and 9', heated by Globars (silicon carbide resistance elements) controlled through independent Variacs (variable voltage controller) to each furnace, built of refractory brick, were disposed about the vaporizer 6, the receiver 2, the column 1, and the salt reservoir 3. Thermocouples 10 were placed in each furnace to permit reading of temperatures in all sections.

The vaporizer was filled with a $ZrCl_4$—$HfCl_4$ mixture containing, on an oxide basis, 2.4% hafnium. Sufficient granular sodium chloride was placed in the salt reservoir to fill it to a depth of 10 inches. All furnaces were then turned on slowly to effect a gradual increase in temperature until temperatures of 330° C. in the salt reservoir and at the top and bottom of the column, 340° C. in the receiver, and 330° C. in the vaporizer were reached. At these temperatures, liquid began to form in the bottom of the salt reservoir and drip down into the column. Operation under these conditions was continued until all sections of the column were wet with liquid salt $ZrCl_4$—$HfCl_4$ mixture. The temperature in the receiver was then increased gradually over a 4-hour period to between 350° C. and 360° C., while the bottom of the column was increased to 340–350° C. and the top maintained at 330–340° C. The vaporizer temperature was also increased over the 4-hour period to 380° C. During the run, vapor passed freely up the column and consumed the lower portions of the solid salt in the reservoir, thereby, in effect, totally refluxing to the top of the column as a liquid which ran down the column. No attempt to remove the more volatile $HfCl_4$ fraction from the top of the column was made, since the quantity of $HfCl_4$ was sufficiently low to be mostly retained in the upper sections of the columns with complete rectification.

After a four-hour period of operation with the column wet, further heating was discontinued and the upper section of the column was then rapidly cooled with air to retain the liquid in such upper section. After cooling, samples for analysis were taken from the bottom of the salt reservoir at the top of the column and from the receiver. These were dissolved in water and the oxides precipitated with $NH_4OH$, filtered, washed and dried. Spectrographic analysis showed an enrichment of hafnium content to 4.4% (oxide basis) in the top of the column, while the hafnium content of the sample from the receiver was 2.1%. The composition of the salt in the receiver was 62.5 mol per cent $ZrCl_4$, 37.5 mol per cent sodium chloride, corresponding to the lowest melting eutectic for the $ZrCl_4$—$NaCl$ system, which melts at 160° C.

Example II

Employing an apparatus substantially the same as that used in Example I except that an extra 12-section Synder floating ball column was placed between the receiver and the previously used column carrying the side arm and vaporizer, the start-up operation of Example I was duplicated until the columns were totally wetted with liquid. In this instance, however, heating of the receiver and lower section of the column was intensified bringing the receiver to a final temperature of 510° C. over a 6-hour period after liquid started running down the column. During this period the bottom of the column was heated to 370–380° C. and a gradient maintained throughout the height of the column to 340–350° C. at the top and 330–350° C. in salt reservoir. After cooling, samples of product were taken as in Example I. The hafnium content of the sample from the receiver was 1.7%, while that in the material from the base of the salt column was 2.95%, based on conversion to oxide basis. The composition of the salt in the receiver was $NaCl.ZrCl_4$, melting at 331° C.

Example III

A separation was carried out employing the same type of equipment used in Example I, except that potassium chloride was used in lieu of sodium chloride. In this instance, an operation at a higher temperature was required to obtain a liquid melt running down the column, the potassium chloride being at 365° C. when liquid formation was effected. The column temperature was increased from 365° C. to 385° C. and the receiver from 365° C. to 395° C. over the 3-hour operating period. Samples were taken as in the foregoing examples. The hafnium content (oxide basis) in the reservoir sample was 2.15% while that at the top of the column was 2.85%. The composition of the salt in the receiver was $2ZrCl_4.KCl$ and melted at 300° C.

As already indicated, to obtain complete separation of hafnium chloride from zirconium chloride, an efficient fractionating column is required. The height of the column and the rate of addition of $ZrCl_4$—$HfCl_4$ vapors will depend upon the size and efficiency of the column used.

Using $ZrCl_4$—$HfCl_4$ mixtures at the naturally occurring ratio (normally less than 3% hafnium) a continuous operation can be undertaken with intermittent take-off of liquid from the top of the column. This affords a virtual total refluxing during the operation. Removal of low-Hf $ZrCl_4$ from the receiver can be carried out in either of two ways. If $ZrCl_4$ free of salt is required, the take-off from the receiver can be located in the vapor space and a fraction of the vapor bled off to a condensing chamber while the remainder is fed up to the lower plates of the column. For this purpose, the receiver is maintained at a higher temperature (of the order of 600° C. to 900° C.) so that virtually all of the $ZrCl_4$ is vaporized out of the salt and substantially $ZrCl_4$-free salt is continually drained as byproduct from the receiver. Alternatively, the receiver temperature can be maintained below 600° C. and a melt of sodium chloride containing dissolved $ZrCl_4$ withdrawn. Such a product is especially well suited to reduction operations to obtain pure zirconium since it can be added directly to a pool of molten magnesium to form metallic zirconium sponge and an easily drained, low-melting by-product salt mixture of sodium chloride and magnesium chloride. If desired, the reduction operation can be carried out in reverse order, as by adding magnesium metal to a pool of the $NaCl$—$ZrCl_4$ melt obtained directly from the distillation receiver.

The utilization of condensed $ZrCl_4$ vapor, as well as other methods of utilizing the $ZrCl_4$-salt compositions, will be obvious to those skilled in the art.

The principle disclosed herein for separating zirconium and hafnium chlorides is also applicable in the separation or purification of other mixtures of the volatile halides of said metals or of other metal halides therefrom. Thus, the separation of $FeCl_3$ from $ZrCl_4$ can be accomplished by operating the column somewhat hotter so that the $FeCl_3$ accumulates in sodium chloride solution at the bottom of the column while $ZrCl_4$ in sodium chloride is collected at the top. Other volatile halides which form low-melting compositions with alkali or alkaline earth metal halides would be separated in a similar manner.

While I prefer to utilize a fractionating column in carrying out my novel process, resort can be made to other means. The separate steps of purification can be effected in a plurality of vaporizers, if desired, cascaded so that the hafnium-enriched vapors will be condensed, and subsequently revaporized in the next unit until the desired concentration is obtained, with the molten salt enriched in zirconium moving in the opposite flow pattern. This type of operation is essentially that which occurs in a fractionating column but with each step separated. Also, operation is contemplated of a batch type distillation wherein a batch is charged to the boiler at the base of the column, solid salt charged into the salt chamber, the column operated at total reflux until the desired enrichment is obtained, and then the system discharged to obtain a hafnium-enriched "tops" and a zirconium-enriched "bottoms."

By the present invention novel methods are provided for separating zirconium halides from hafnium halides continuously and for the recovery of such halides (chlorides, bromides, iodides, and fluorides) in quantities sufficient for large-scale commercial use. Examples of such compounds include $ZrCl_4$, $ZrBr_4$, $ZrI_4$, $ZrF_4$, $HfCl_4$, $HfBr_4$, etc. The product obtained is directly usable in a reduction to metal or can be employed in other processes requiring anhydrous halide utilization and without recourse to additional steps to regenerate the anhydrous starting material. Similarly, in addition to the specific alkali metal halides mentioned, use can also be made of other metal halides of the type contemplated, including the various chlorides, bromides, and iodides of sodium, potassium, lithium, etc. Additional advantageous features of the invention will be apparent, including the use of low-cost reagents and standard equipment.

While described in its application to particular embodiments, the invention is obviously subject to variance and modification without departing from its broader aspects. Therefore, except as limited by the appended claims, all such changes and modifications are contemplated as coming within the spirit and scope of the invention.

I claim as my invention:

1. A process for separating zirconium and hafnium halides from vaporous mixtures which comprises contacting the mixed halide vapors in a separating zone with a molten alkali metal halide salt in which said halides are soluble, and separately recovering from said zone the separated hafnium and zirconium halides.

2. A process for separating a volatile halide of zirconium and hafnium from vaporous mixtures thereof, which comprises contacting the mixed halide vapors in a fractionating zone with a countercurrent flow of a molten alkali metal halide salt as a solvent for said mixed halide vapors, and recovering the separated hafnium-enriched product from the upper part of said zone and the zirconium-enriched product from the lower part of said zone.

3. A process for separating mixed volatile halides of zirconium and hafnium comprising contacting said mixed halide vapors in a fractionating column with a countercurrent flow of molten salt containing an alkali metal halide as solvent for said vapors, operating said column at total reflux and intermittently withdrawing for recovery the separated hafnium-enriched product from the upper portion of said column and the separated zirconium-enriched product from the lower portion thereof.

4. A process for separating hafnium tetrachloride from zirconium tetrachloride from a vaporous mixture of said tetrachlorides, which comprises charging said mixture into an intermediate point of a fractionating column and a solid alkali metal chloride solvent for said tetrachlorides to the upper portion of said column, establishing a thermal gradient within said column with the reboiler at the base of the column maintained at a temperature between 350° C. and 600° C., the lower portion of the column between 350° C. and 500° C., and the upper portion of the column between 330° C. and 350° C., operating said column at total reflux and intermittently withdrawing for independent recovery the separated hafnium-enriched product from the upper part of the column and the zirconium-enriched product from the lower part of said column.

5. A process for separating hafnium tetrachloride from zirconium tetrachloride from a vaporous mixture of said tetrachlorides which comprises contacting said vaporous mixture with a countercurrent flow of molten salt containing sodium chloride as a solvent for said tetrachlorides within a fractionating zone maintained at an elevated temperature, removing the separated hafnium-enriched product which results from the upper part of said zone and the separated zirconium-enriched product from the lower part of said zone, and separately collecting said products.

6. A process for separating hafnium tetrachloride and zirconium tetrachloride from a vaporous mixture thereof which comprises contacting said mixture with a countercurrent flow of molten salt containing potassium chloride as a solvent for said mixture within a fractionating zone maintained at an elevated temperature, removing the separated hafnium-enriched product which results from the upper part of said zone and a zirconium-enriched product from the lower part thereof, and separately collecting said products.

7. A process for separating hafnium tetrachloride and zirconium tetrachloride from a vaporous mixture of said tetrachlorides which comprises charging the mixed halide vapors to a fractionating zone at an intermediate point of the latter, directly contacting the vapors therein with a flowing molten salt containing sodium chloride as a solvent for said vapors establishing a thermal gradient within said fractionating zone by maintaining a reboiler temperature of between 350° C. and 900° C., a temperature of between 350° C. and 500° C. in the lower part of said zone, and a temperature of between 330° C. and 500° C. in the upper part of said zone, operating the fractionating zone at total reflux, intermittently withdrawing from the upper part of said zone the resulting hafnium-enriched product and from the lower part of said zone the zirconium-enriched product, and separately collecting each.

References Cited in the file of this patent

UNITED STATES PATENTS

| | | |
|---|---|---|
| 1,418,528 | Burgess | June 6, 1922 |
| 1,528,860 | Van Arkle et al. | Apr. 27, 1926 |
| 1,646,734 | Marden | Oct. 25, 1927 |
| 2,443,253 | Kroll et al. | June 15, 1948 |
| 2,533,021 | Krchma | Dec. 5, 1950 |
| 2,618,531 | Lindblad | Nov. 18, 1952 |

FOREIGN PATENTS

| | | |
|---|---|---|
| 460,410 | Great Britain | Jan. 27, 1937 |
| 596,576 | Great Britain | Jan. 7, 1948 |

OTHER REFERENCES

Weissberger: Technique of Organic Chemistry, vol. IV, Distillation; published 1951 by Interscience Publishers, Inc,. New York, N. Y., pages 317–341.

Thompson: "A Preliminary Study of Zirkite Ore," Journal of Physical Chemistry, vol. 26 (1922), pp. 822–823.

"First Final Report 774—Anhydrous Chlorides Manufacture," pp. 18–19.

Mellor: "A Comprehensive Treatise on Inorganic and Theoretical Chemistry," vol. 7, 1927, pp. 144–145. Longmans, Green and Co., New York.